| United States Patent [19] | [11] 3,883,925 |
|---|---|
| Muller | [45] May 20, 1975 |

[54] APPARATUS FOR FILLING TUBULAR CASINGS

[75] Inventor: Johannes Muller, Biberach/Riss, Germany

[73] Assignees: Albert Handtmann; Metallgubwerk, Armaturen-und Fleischereimaschinen Fabrik, Biberach/Riss, Germany

[22] Filed: Apr. 24, 1972

[21] Appl. No.: 246,996

[30] Foreign Application Priority Data

Apr. 29, 1971 Germany............................ 2121006

[52] U.S. Cl........................................ 17/33; 17/35
[51] Int. Cl...................... A22c 11/02; A22c 11/10
[58] Field of Search............... 17/37, 41, 33, 34, 35, 17/36; 222/218; 417/462

[56] References Cited
UNITED STATES PATENTS

| 981,804 | 1/1911 | Sloan et al. .......................... 417/462 |
| 3,010,144 | 11/1961 | Kochjohann........................... 17/41 |
| 3,140,509 | 7/1964 | Müller .................................. 17/33 |
| 3,253,297 | 5/1966 | Nuckles................................ 17/35 |
| 3,631,565 | 1/1972 | Müller .................................. 17/37 |

FOREIGN PATENTS OR APPLICATIONS 848,312     1949     Germany............................. 17/35

*Primary Examiner*—Richard C. Pinkham
*Assistant Examiner*—Joseph R. Taylor
*Attorney, Agent, or Firm*—Murray Schaffer

[57] ABSTRACT

A sausage filling apparatus characterized by the provision of a displacement pump having at least two alternately operative displacement chambers. This pump is employed as the proportioning pump, which operates in a cycle where the interval or pause between the filling operations is arranged to be several times shorter than the time required for the filling operation. The twisting-off device is simultaneously and continuously drivable.

12 Claims, 8 Drawing Figures

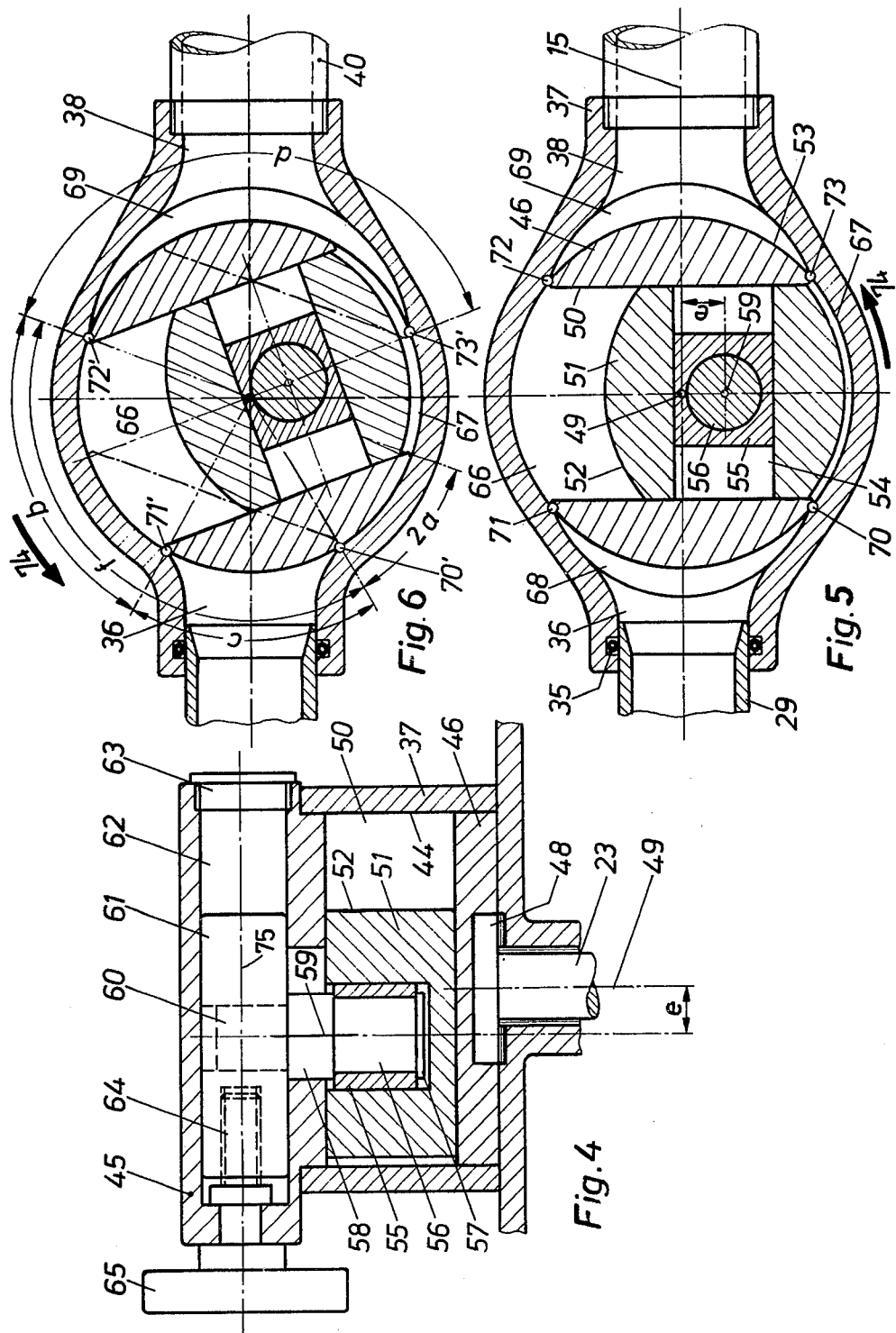

3,883,925

APPARATUS FOR FILLING TUBULAR CASINGS

BACKGROUND OF INVENTION

This invention relates to an apparatus for portioning and twisting-off a pasty substance, and in particular to a sausage stuffing machine.

Various devices are known for portioning the filling and twisting-off the casting in the produciton of small sausages. The highest working speeds and portioning accuracies are currently obtained by a system having a power driven measuring piston which is operated by means of a crank drive. During the rising or working stroke of the measuring piston, the portion of filling is expelled out of a measuring cylinder into the sausage skin and the twisting-off device is held stationary. During the return stroke of the measuring piston, the measuring cylinder is filled. The sausage skin is twisted off between the expulsion of the individual portions by rotating the twisting-off nozzle at the end of the filling porcess and stopping it again before the next filling operation begins.

In another known apparatus, the filling substance is uniformly advanced without any interruption by a pump, such as a gear pump, driven with a constant expelling speed, and the twisting-off device operates continuously at a uniform speed. The object is to keep as constant as possible the diameter of the length of material in the tubular sleeve issuing from the nozzle while simultaneously dividing it at fixed predetermined lengths. The weight per quantity can be adjusted only within very narrow limits by changing the speed of the pump or of the feed pressure and the diameter of the filled tubular sleeve. On the one hand, such a division of the filling is itself inaccurate and can in practice be achieved only by constricting the filled sleeve from the outside with the use of non-rotating parts. The forces acting on the sleeve at the point of impression are localized and so great that the sleeve is frequently ruptured. Such devices can therefore by operated at a low working speed only and a correspondingly low output.

The maximum operating speeds achievable in portioning pasty substances and in twisting-off the sausage skins are limited by the sensitivity of these substances to high pressure stressing and by the power of the resistance of the sausage skin. When certain values of the flow speed of the filling composition or certain pressure limits are exceeded, fat may be extruded and deposited on the outer surface of the sausage meat, i.e. so called lubrication occurs. In addition, the quality of the pasty substance suffers upon being subject to high pressure. The higher the speed of the expulsion of the filling into the sausage skin, the higher this skin is stressed, so that additional loading of the sausage skin occurs during the twisting-off operation. This further increases with increasing acceleration of the twisting-off nozzle and the sausage skin drawn thereon.

It is the object of the present invention to provide an apparatus for filling sausages and the like which overcomes the problems, disadvantages and difficulties of the prior known devices.

In particular, it is an object of the present invention to maximize output in portioning, filling and twisting-off pastry substances in coherent tubular sleeves whilst minimizing expenditure of power and stressing of material of the sleeve.

These and other objects as well as the advantages of the present invention will be seen in the foregoing description.

SUMMARY OF THE INVENTION

Sausage filling apparatus in accordance with the present invention is characterized by the provision of a displacement pump having at least two alternately operative displacement chambers. This pump is employed as the proportioning pump, which operates in a cycle where the interval or pause between the filling operations is arranged to be several times shorter than the time required for the filling operation. The twisting-off device is simultaneously and continuously drivable.

Preferably, in accordance with the present invention, individual filling portions having a predetermined weight are formed and expelled by the pump in cylindrical succession. The twisting-off process is carried out in alternation with the expulsion. The twisting-off device being allowed to function continuously so that the individual expelling operations of the pump can be made to follow each other much more closely in time than heretofore known.

The pause between the individual expelling operations may be selected to be as short as desired, that is to say, it may be adjustable at a zero value, although, it should be maintained sufficient for the length of substance advanced, intermittently through the expulsion nozzle by the pump, to be retarded or stopped between each of the individual expelling operations so that the twisting operation can be effected to produce a proper constriction in the casing. Even with a permanently constant twisting-off speed, the exact location of the twisting-off position is obtainable without the use of mechanical parts having to act on the skin from outside. The effect on this twisting-off position may be reinforced by providing for the feed direction of the encased length of composition to be inclined towards the axis of the nozzle, behind the nozzle. The conveyed length then tends to buckle somewhat by the deflection at the end of the nozzle and to be constricted thereby. As soon as the feed speed is reduced or the length of substance is stopped, this constriction occurs immediately at the end of a nozzle. As a result, in the case of small portions, the present invention obtains an extraordinary increase in output with minimal stressing of the tubular sleeve.

The twisting-off device is also preferably variably drivable. The drives for the twisting-off and filling operations are adjusted in synchronism with the filling machine in such manner that the maximum twisting-off speed takes place at least near the point or area between two filling operations, whilst the minimum twisting-off speed occurs in the area of the maximum filling speed. In principle, it is preferable that the maximum of one operation may also coincide with the minimum of the other operation. In employing high operating speeds and very elastic filling compositions, the maximum twisting-off speed may be shifted in time relatively to the succeeding filling operation, so that, for example, it coincides with the beginning of the succeeding filling operation. This time displacement cannot be exactly indicated, but must be determined on the basis of the given circumstances.

However, the end of one filling operation has much less effect on the stressing of the casing than the beginning of the succeeding filling operation. For this reason, the speed of the filling operation at its initiation should be increased more slowly than the speed is reduced at the end of the filling operation. Preferably, the filling operation, the speed of which proceeds at least approximately in the form of a sinusoidal curve, is interrupted for a period or interval after exceeding the maximum speed.

Further features and advantages of the present invention will be apparent from the following description, and by reference to the accompanying drawings which are exemplary of the present invention.

BRIEF DESCRIPTION OF DRAWINGS

In the drawings:

FIG. 4 is a partial section through the apparatus taken on the line IV—IV of FIG. 3, FIG. 5 is a partial section taken on the line V—V of FIG. 3, FIG. 6 is a view corresponding to FIG. 5 showing a modified embodiment at the beginning of the filling operation, and FIG. 6a is a view of operating position of the apparatus corresponding to FIG. 6 for the speed diagram according to FIG. 2a.

DESCRIPTION OF INVENTION

Figure 2:
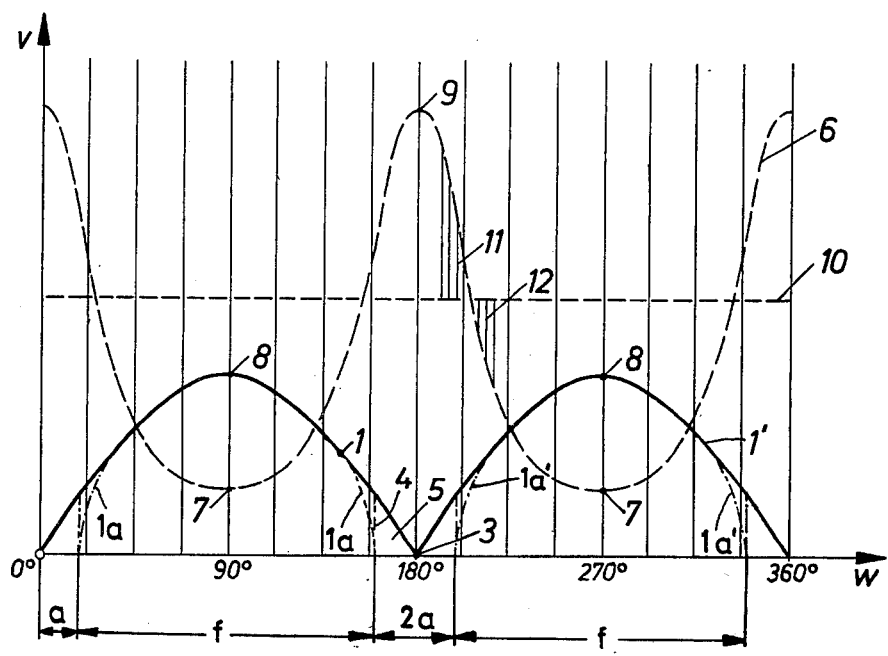
FIG. 2 is a comparable diagram of the speed of filling and twisting in the device formed according to the present invention.
Figure 1:
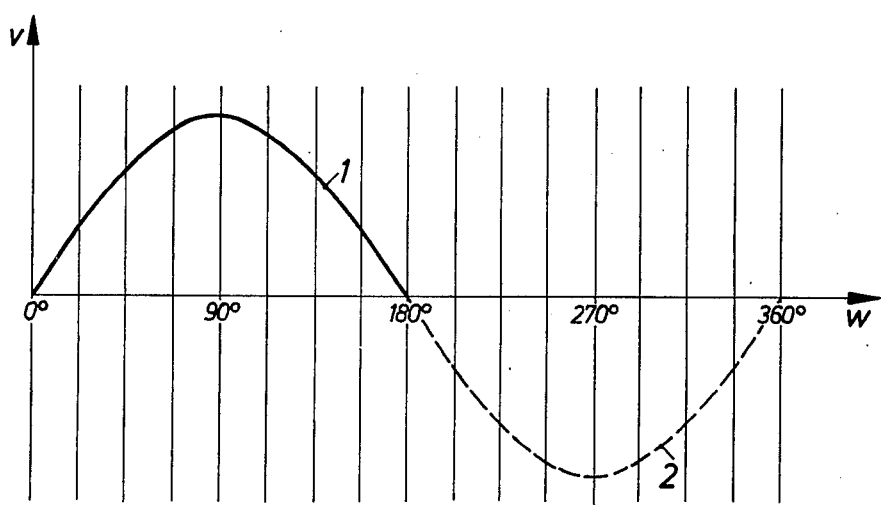
FIG. 1 is a diagram of the speed of a portioning and filling device which operates according to the heretofore conventional methods.

The present invention may be best understood by first discussing its method, illustrated in FIG. 1 and 2, by which pasty substances may be proportioned, and extruded or expelled into the receiving skin or casing, and wherein the casing may be twisted-off to form the required sausage like shape. The operation of the method will refer to the apparatus for carrying it out which is shown in FIGS. 3 to 6, and which will be described later. Briefly, however, the apparatus of the present invention employs a displacement pumping device having two alternately operative chambers functioning in cooperation with a simultaneously operating twisting-off device, in a cyclic manner.

In FIG. 1 the operation of the conventional filling devices is schematically illustrated, by showing the velocity or speed v of flow of pasty material and speed of the twisting operation, plotted in the ordinate against the angular dispositon of the working stroke w of the pumping mechanism, in the abscissa. The expelling operation or filling speed 1, and the twisting operation or twisting speed 2 succeed each other directly and proceed in a sinusoidal curve pattern. Each operation extends a working stroke angle of 180°. Consequently, an interval or pause of substantially equal length occurs between each successive filling operation. The speed of each operation must, over a given period, rise from a zero value to a maximum and then be reduced to the zero value again, over a like period before the next operation takes place. Consequently, the filling and twisting operations take an inordinately long time.

In accordance with thee method of the present invention, as shown in FIG. 2, succeeding identical expelling operations 1 and 1' are made up to follow each other directly without any time delay. Each operation follows a half-sine curve and distribution of the substance of the filled portions is practically uniform. Twisting-off is set to take place at the zero speed point 3 between the two curves without any external influence on the casing being necessary. The distribution may be improved if an interval or pause 2a is located between the successive filling operations, during which the end of one filling operation is spaced from the beginning of the succeeding one, leaving the nozzle and casing free of passing substances. This can be easily accomplished by synchronously driving the filling pump and rotating nozzle, each of which produce the indicated filling curves 1 and 1' respectively and the twisting-off curves 6. By relatively adjusting one or the other of the curves, they may be modified as for example, to vary the speed of filling or the speed of twisting off at any point in the cycle. Increasing the speed at the end of each filling stoke of the pump to a more rapid rate than the rate in the remaining portion of the curved will produce an interval in which the twisting off operation can take place without pasty substances passing through the nozzle. As seen in FIG. 2 both ends of each filling curve are modified so as to shorten each succeeding curve by an interval a. In general the interval should be several times shorter than the length of the filling curve (i.e. only a small angular movement relative to the entire working stroke). For example, as in FIG. 2, the value a is set equal to 20° of the working stroke of the pump. This has proved to be extremely practical, since, in principle, wedges 5 are cut-off the surface of the sine curve by the limiting lines 4 which produces slightly deformed sinusoidal curves 1a and 1a' which provide ample interval for the twisting-off operation. The exact form of the curves 1a and 1a' is determined by the elastic property of the filling compositions employed. It will be appreciated that suitable curved diagrams may also be used, in which for example the twisting off nozzle rotates at a constant speed.

The twisting-off accuracy is improved and the stressing of the sausage skin or similar casing is reduced if the twisting-off speed is periodically varied according to the curve 6. Preferrably, the minimum speed 7 of the twisting-off device should coincide with the maximum 8 of the filling speed and the maximum 9 of the twisting off speed should coincide with the minimum of the filling speed at 3. In addition, the curve 6 should be so distorted that, - as shown by a comparison with the arithmetically average speed 10, - the higher speeds 11 occur only briefly, whilst on the other hand, lower speeds occur over much more longer intervals. According to the illustration, higher speeds best occur only at about 25 percent of the cycle and practically only within the interval 2a, when, therefore, the casing or skin is not filled. Due to a lower speed of rotation of the nozzle externally of the twisting-off area, the sausage skin is therefore stressed correspondingly less.

With the described method in mind reference can now be made to the specific embodiment of the invention in the form of the apparatus, seen in FIG. 3 through 6. As seen in FIG. 1 the device for portioning, extruding the filling and for twisting-off the casing is located in a housing 13 which is mounted on the outlet end of a conventional mixing and emptying machine which serves as the source of comminuted pasty filling substance, made in the well known manner and delivered to a supply port P. Mounted in series along the axis 15 of the filling substance supply port P are a double-acting rotary piston pump indicated generally by the numeral 16 and a rotatably journalled and driven twisting-off nozzle 17. A casing is applied to the nozzle 17 in known manner before the fillng operation, and is continuously drawn off to the left hand side as shown in the drawing as it is filled, and twisted to form the desired links.

The pump 16 and the twisting-off nozzle 17 obtain their drive from a common shaft 18 which is mounted in the apparatus housing 13 and is in engagement, by a detachable cross key coupling 19, with a drive shaft 20 connected to the motor of the filling making machine 14. The pump is driven by way of a pair of mating bevel gears 21, 22 and a vertical shaft 23 forming its axis of rotation whilst the nozzle 17 is driven through a pair of identical elliptical gear wheels 24, 25. The gears 24 and 25 are respectively secured at each of the two focal points of the ellipses to the shaft 18 and an intermediate shaft 26. A gear wheel 27, fixedly secured to ellipse 25, engages the teeth 28 of a cylindrical sleeve 29 which is mounted to rotate in a bore 30 coaxial with the axis 15. At the outer end of the sleeve 29 a screw cap 31 secures a connecting bushing 32 to the nozzle 17. The bushing 32 has a funnel-shaped inlet opening 33 leading to the twisting-off nozzle 17. The nozzle 17 can be easily replaced with only a few manipulations of the screw cap 31 and removal of the bushing 32 from the housing 13. The nozzle 17 is rotated at a speed corresponding to the curve 6 seen in FIG. 2 by means of the elliptical gear wheels 24 and 25.

The sleeve 29 has a funnel-shaped inner end 34 about which engages a seal 35. The inner end opens into an outlet passage 36 formed in an enclosure for the pump 16. A flanged bush 40 is screwed into an inlet channel 38 of this housing 37. The enclosure 37 is concentric to the drive shaft 23 and is suitable mounted on the upper wall 39 of the housing 13. Another threaded bush 42 is screwed into a countersunk bore 43 of the machine 14 and presses the flange 41 of the bush 40 with a sealing effect against the bottom of a countersunk bore 43. As seen therefore the filling will move along the axis 15 from the supply port P to nozzle 17, through the pump 16.

The pump enclosure 37 has an axial cylindrical through bore 44 which is closed at its top by a cover 45. A rotatable piston 46 is mounted in this bore and is connected to a flange 48 integral with the shaft 23 by means of a screw or pin 47. Perpendicular to the common axis of rotation 49 of the shaft 23 and the rotatable piston 46 is a slot or groove 50 of rectangular cross section which is cut vertically into the piston. A double-acting pump piston 51 is displaceably located in the slot 50. The two front faces 52 of the pump piston 51 are partially cylindrical having the same radius as the circumferential surface 53 of the rotatable piston 46. The length of the pump piston 51, however, is smaller at least by the pump stroke than the diameter of the rotary piston 46.

As seen in FIG. 5 the pump 51 has transversely to its side surfaces a second rectangular groove or slot 54 which is open at the top and receives a slide block 55. An adjusting pin 56 fits from above into a vertical bore in the slide block 55 and is axially secured thereto on both sides by means of collars 57, 58 or similar locking members. The axis of the adjusting pin 56 is indicated by 59. The upper end 60 of the adjusting pin extends into a transverse bore of a cylindrical bolt 61 which is displaceable in a horizontal bore 62 formed in the cover 45. This bore 62 is closed at its right end, (FIG. 4) by a cap 63, and a screw 64 is mounted at its left end. The screw 65 is axially secured by suitable collar means and engages in a corresponding thread in the cylinder bolt 61. The screw 64 is provided with an external adjusting knob 65.

By turning the knob 65, the axis 59 of the adjusting pin 56 can be displaced relatively to the fixed axis 49 of the shaft 23 and thus the axial eccentricity e between the pump piston 51 and the rotatable piston 46 may be adjusted (see FIG. 4). The stroke of the pump piston 51 in the slot 50 then amounts to $2e$, and the end positions of the piston are reached when the slot 50 is perpendicular to the feed axis 15, that is to say, when it extends transversely to the inlet 38 and outlet 36. As will be seen in FIGS. 5 and 6, two displacement chambers 66 and 67 are formed. In the figures the outlet displacement area 66 is at its maximum, while the displacement chamber 67 its minimum, as the piston pump 51 is adjustable to the maximum eccentricity $e$ to vary the volume of chambers 66 and 67. It will be obvious that as the rotary piston moves the pin 56 holds the pump piston 51 fixed, however it seems to slide within the transverse slot 50 relative to the rotary piston, thus successively enlarging and then reducing the volume or area of the chambers 66 and 67, alternatingly.

Figure 2A:
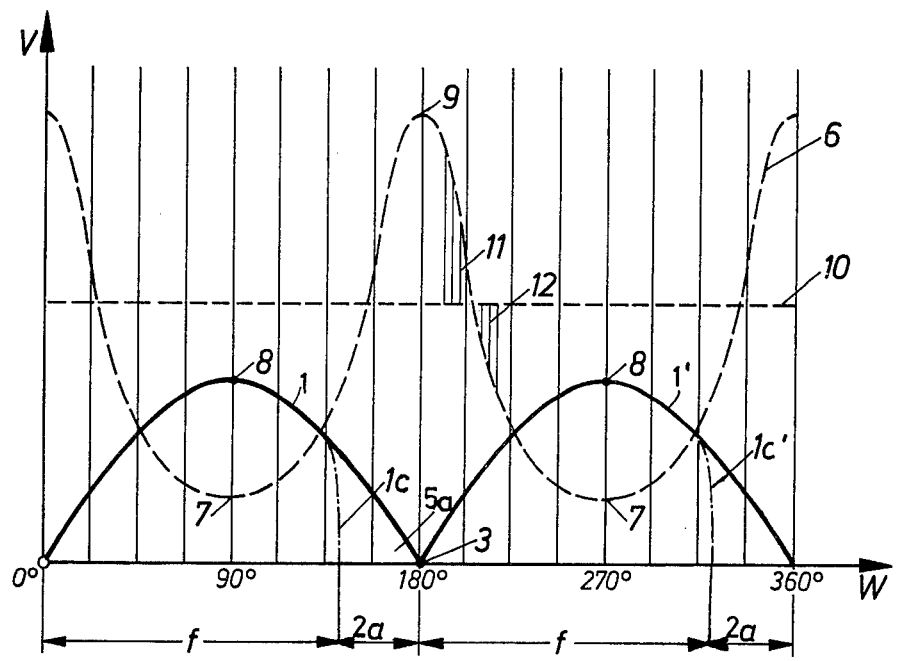
FIg. 2a is a diagram corresponding to FIG. 2 with the interval between filling operation shifted towards the expelling end of the operating cycle.

In operation, as the sausage or similar comminuted material is fed through the supply port P and the drive shaft 18 rotated, the pump 16 is caused to rotate about the axis 49 while the nozzle 17 is caused to rotate about the axis 15, in the desired, selected synchronism to form the curves seen in FIG. 2 or 2a. As rotation progresses the chambers 66 and 67 pass the inlet and outlet 36 and 38. The material is thus received successively in each of the displacement chambers 66 or 67 and is carried to the outlet end 36 in fixed or defined portions. Simultaneously, the reciprocal piston pump within the rotating pump acts to force the material out of the filled chamber by reducing the volume of that chamber. Simultaneously also the other chamber increases in size and is presented to the supply port P to be filled. This procedure produces a continuous stream of successive portions which are transferred to and expelled into the nozzle. The speed of expulsion of the successive portions is dependent on the adjustment of the pump piston to the rotary piston, the relationship of filling curve to the twisting off curve being a function of the gears 21 and 22, and 24, 25 respectively.

The interval between successively expelled portions is a function of the angular opening and closing of the inlets and outlets, i.e. the relationship between the presentation of the chambers 66 and 67 of the inlets and outlets relative to the presentation of the piston walls 46 as the rotary piston 44 continuosuly rotates.

As shown in FIG. 5, the outlet passage 36 and the inlet passage 38 of the housing 37 have cresent-shaped enlargements opening into the hose 44 of the pump 46. The enlargements extend in each case through 100° from the axis 49 relative to four control points 70–73 and forming enlarged opening portions 68 and 69 on the outlet and inlet ends respectively of the pump. The ends of the rotatable pump 46 forming the slot 50 are sufficiently rounded for them to terminate at the control points (enlarged only for clarity) in the end position of the cycle shown and to subtend an angle of 80° from the axis 49 as the center. The external circumferential portions of the rotary piston 46 have an arcuate extent approximating that of the distance between control points 70 and 71 and 72 and 73 respectively (i.e. 100°) and thus present a closure to opening 68 and 69 for 20° more than chambers 66 and 67 present openings during each half of the rotary cycle of piston 46. The operating position shown in FIG. 5 where the slot 50 is transverse to the axis 15 would produce a situation corresponding to point 3 in FIG. 2 and the expulsion speed would proceed according to the curves 1 and 1'. From the position of the gear wheels 24 and 25 in FIG. 3 it will be seen that in this position of the gear mechanism, the maximum 9 of the twisting off speed of the curve 6 is reached.

If the rotatable piston 46 is rotated in the direction of the arrow 74, as seen in FIG. 5, communication of the displacement chamber 66 is established at control point 71 by way of opening 68 with the outlet passage 36 and the effective projection of the eccentricity between the axes 49 and 59 becomes smaller and smaller due to the fixed position of piston pump 51. The piston 51 moves relatively out of its end position and continues to decrease the volume in the chamber 66, while simultaneously increasing the volume in chamber 67.

Similarly, the communication of the chamber 67 with inlet 38 is established by way of opening 69 so that filling composition, subjected to slight pressure by the filling pump in the machine 14 can penetrate into the continuously increasing chamber 67. The expelling and inwardly flowing speeds of filling material increases until the pump is at an angle of 90° (or to 270°) to the axis 15 and the slot 50 is located in the direction coaxial with the feed axis 15. Preferably, the gear wheels 21, 22 are at a ratio where a reduction of 1:2 has taken place, so that the elliptical gears 24, 25 are turned through 180° while the pump has rotated about an angle of 90°. The rotary speed of the nozzle 17 thus reaches its minimum 7, in the curve 6 at the time the filling speed reaches its maximum (FIG. 2).

If the control points 70–73 are each separated by 90°, then the angle $\alpha = 5°$ would be obtained, that is to say, at approximately a quarter of the magnitude of the curve 8 of the illustration in FIG. 2. The wedges 5 would then be only a quarter as wide and would scarcely change the filled amount. However, an interval $2a$ of 10° would arise between two filling operations, said interval being usually sufficient to facilitate the twisting off operation.

The previously mentioned method may also be easily accomplished with the embodiment shown in FIG. 6. Here the cresent-shaped enlargement 68 on the outlet is omitted so that between the control points 70' and 71' an angle $c$ equal to 60° is obtained, while an angle $d$ is obtained between 72' and 73' amounting to 140°. Thus the outlet 36 will be closed for an interval much less than it is open. However, at the outlet end or opening of the slot 50 an angle $f = c + b = 140°$ is obtained, so that the displacement chambers 66 and 67 exceed angularly the opening 69 at the inlet 38. Consequently, during the interval $2a$ at which time the outlet 36 is closed, the chambers 66 or 67 are (unlike FIG. 5) in communication with the opening 69 at the inlet 38. Since the angle $d$ extends over 140°, the inlet passage 38 always remains in communication with each of the two displacement areas through an arc of 220°. The provision of the interval corresponding to $2a$ allows the complete closure of the outlet 36 by either halves of the rotary piston so the feeding may proceed from either 66 or 67. However, since the interval $2a$ occurs in the area of the dead centre positions of the piston and only within the angle $2a = 40°$, no appreciable feed losses occur, and the sausage meat or other filling material is prevented from being unnecessarily compressed. Consequently, feeding is achieved, thereby according to the curves $1a$ and $1a'$ as shown in FIG. 2.

Differing from FIG. 2, is the embodiment according to FIG. 2a wherein the interval $2a$ is entirely shifted to the end of the expelling process. By adjustment of the mechanism a wedge $5a$ is cut off at the end of the sinesoidal curves $1c$, which wedge is twice as wide as one of the wedges 5 of FIG. 2. The succeeding expelling operation, furthermore, is begun at feed speed zero in point 3, so that the maximum speed 9 of the twisting off curve 6 coincides with this point 3. This makes it possible to decrease the stressing of the casing while rendering possible a more rapid and more accurate fixing of the twisting off point. On the other hand, the maximum twisting off speed is shifted to the end of the interval, i.e. approximately the entire rise in twisting speed occurs during this interval, whilst the high twisting off speeds following the maximum 9 lie in the range of only the gradual increase in the feed speed.

Figure 6A:
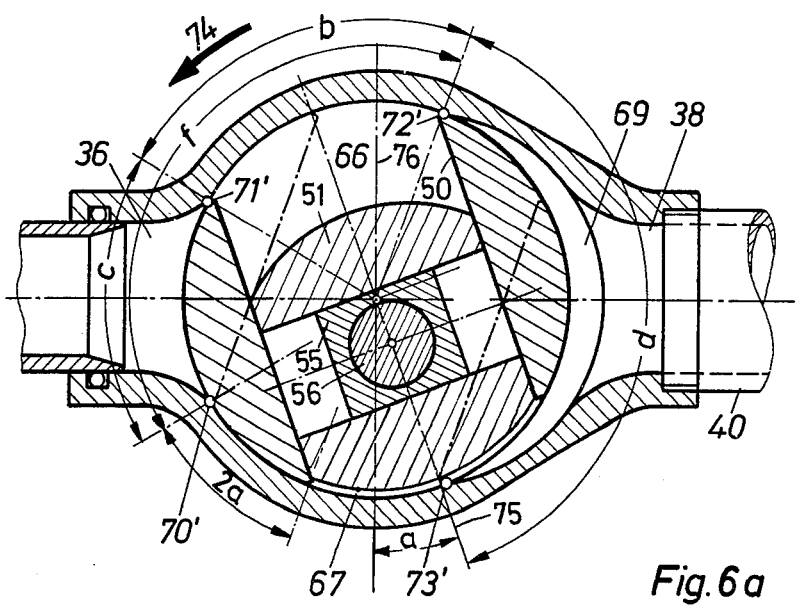
Figure 3:
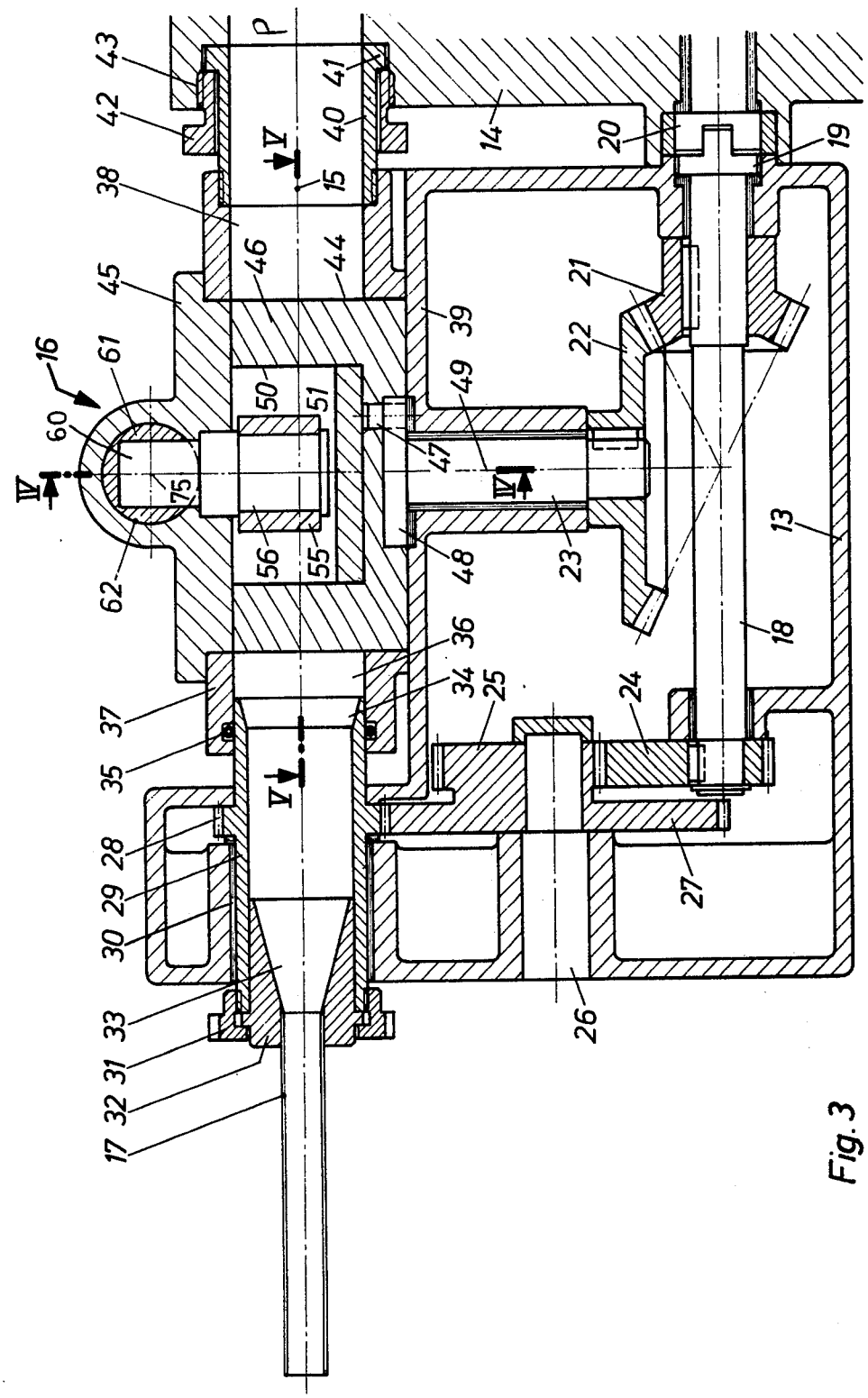
FIG. 3 is a longitudinal vertical section through an apparatus formed according to the present invention.

As may be seen from the FIG. 6a developed from FIG. 6, the shifting of the interval $2a$, according to FIG. 2, is achieved by the feature that the axis 75 of the cylindrical bolt 61 shown in FIGS. 3 and 4, to which the link pin 56 is secured, is inclined through the angle $a$ relatively to the transverse plane 76. The axis 75 coincides in FIG. 6a with the centre plane of the slot 50. The piston 51 has, according to FIG. 6a reached the end position corresponding to the point 3 of the diagram in FIG. 2a. The inclined position may be achieved by rotating the cover 45 in the through bore 44. It may be thus, infinitely adjusted to selectively change the valve $a$.

The invention is in no way limited to the embodiments shown which can be modified in many other ways. For example, the nozzle 17 need not be driven by elliptical gears. Other suitable non-round or eccentric gears may also be selected or the reduction ratio for the shaft 23 changed in any other manner. The nozzle 17 need not necessarily rotate at an appreciable speed to effect the twisting off, but the change of speed may be effected in such manner that the minimum 7 is practically zero. Nor is it indispensable to accelerate again immediately after reaching this zero value, i.e. the twisting off nozzle may be stationary for a limited time during the relatively long filling period. This is of special importance when the nozzle is to be provided for any reason with a separate drive which is only interlocked or control dependent on the pump drive.

However, consideration must be given to the feature that a certain acceleration or retarding value is not exceeded. This value may, if necessary, be obtained by experiments with the casing material to be used. On both sides of the maximum 9, these forces should be kept approximately constant. Again, the change of acceleration and retardation must always be effected continuously.

The illustrated pump with double acting stroke piston provided in the rotating rotary piston has the advantage that the rotary piston itself acts as a control slide and comparatively small associated displacement areas are made possible resulting in improved constant volume. In priciple, however, instead of this pump, a four-way rotary slide may be provided which controls two external displacement chambers. The use of a double-acting piston would also be possible, but it seems better in that case to use two coaxial cylinders extending on both sides, in which two rigidly interconnected pistons are guided for movement in the same direction.

Again, the use of three or more displacement chambers is possible in order to obtain the pump speed within limits with a given delivery output.

In order to keep the volume associated with the pump smaller, the nozzle sleeve 29 may be appreciably shortened by replacing the bearing 30 with a correspondingly smaller axial bearing.

Application is not limited to the sausage filling. It is also possible to pack cheese spread or pasty technical or industrial products in the same manner.

What is claimed:

1. Apparatus for continuously filling tubular casings with comminuted substances comprising a housing having an inlet port communicating with a source of said substance and an outlet port aligned along a common axis, a nozzle mounted within said outlet port to rotate about said common axis, said nozzle supporting a substantially endless elongated tubular casing, pump means interposed between said inlet and said nozzle, said pump means comprising a substantially annular enclosure having an inlet and outlet opening lying along said common plane and communicating with the respective inlet and outlet ports of said housing, a circular piston mounted coaxially within said enclosure coplanar with inlet and outlet openings and having an axis of rotation transverse to the common axis, said piston having a diametral slot therein, a reciprocable piston located in said slot and dividing said slot forming in cooperation with the enclosure two opposed chambers, said reciprocable piston being rotatable about a transverse axis parallel to but offset from the axis of rotation of said rotary piston, said rotary piston thereby causing said reciprocable piston to move transversely within said slot to cause each chamber to successively and alternately enlarge and reduce their volume on presentation to the inlet and outlets respectively, said chambers on enlarging receiving a portion of said substance from said inlet port and on reducing expelling said portion into said casing, means for continuously driving said nozzle to cyclically run at a variable speed between a maximum and minimum speed and means mechanically interconnecting said nozzle and said rotary piston for simultaneously driving said rotary piston and rotating said nozzle so that the minimum speed of said nozzle occurs during the successive transfer of portions of said substance from said inlet port to said casing and the maximum speed of said nozzle occurs during the intervals between successive transfers thereby synchronously twisting off of said casing into links between said successive transfers.

2. The apparatus according to claim 1 wherein said means for driving said proportioning pump and said means for rotating said nozzle comprises a common drive shaft connected to motor means for driving the source of substance supply.

3. The apparatus according to claim 1 wherein the enclosure for the rotary piston is enlarged adjacent at least one of the inlets and outlets.

4. The apparatus according to claim 1 including means for adjustably locating the transverse axis of said double acting piston eccentrically of the axis of said rotary piston.

5. The apparatus according to claim 4, wherein said means for adjustably locating the transverse axis of said double acting piston comprises a pin extending through said transverse centre, said pin extending rotatably into a slide block, said slide block movably guided within a channel extending transversely to said axis and fixedly adjustable relative thereto.

6. The apparatus according to claim 5 including a housing for said proportioning pump, said channel being located in a cover for said housing.

7. The apparatus according to claim 6 wherein said cover is rotatably adjustable about the axis of said rotary piston.

8. Apparatus for filling tubular casings with comminuted substances, comprising locating means for supporting an endless casing on a rotatable nozzle, a proportioning pump having an outlet communicating with said nozzle and an inlet communicating with a source of said substance, means for driving said proportioning pump to expel successive volumetric portions of said substance through said nozzle into said casing with an interval between successive expulsions several times shorter than the length of expulsion, and drive means for continuously rotating said nozzle at a cyclically variable speed between a maximum and a minimum, to twist off said casing after each successively expelled portion to form a link thereof, and means for synchronizing the drive means of said proportioning pump with the means for continuously driving said nozzle to simultaneously drive said nozzle so that the maximum speed said nozzle for twisting said casing occurs during the interval between successive expulsion.

9. The apparatus according to claim 8 wherein said means for rotating said nozzle includes a gear train comprising a pair of cooperating elliptical gears mounted for rotation about their respective focal points whereby a variable speed of nozzle rotation is effected.

10. The apparatus according to claim 8, wherein said pump has a displacement member defining at least two variable displacement chambers within said pump, said pump being alternately effective to receive portions of said substances, in each chamber, from said source and to deliver said portioned substance to said nozzle.

11. The apparatus according to claim 10 including means for shifting the cycle of said pump expulsion relative to said nozzle rotation so that the maximum rotation speed of said nozzle occurs substantially at the onset of each succeeding expulsion.

12. The apparatus according to claim 11 including means for increasing the speed of said pump during expulsion more slowly than it is decreased.

* * * * *